United States Patent
Nam et al.

(10) Patent No.: US 10,451,915 B2
(45) Date of Patent: Oct. 22, 2019

(54) POLARIZING PLATE WITH POLYETHYLENE TEREPHTHALATE FILM AS PROTECTIVE FILM, AND METHOD FOR MANUFACTURING SAME

(71) Applicant: LG CHEM, LTD., Seoul (KR)

(72) Inventors: Sung Hyun Nam, Daejeon (KR); Seunghee Nam, Daejeon (KR); Kyun Il Rah, Daejeon (KR); Dae Woong Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 442 days.

(21) Appl. No.: 15/113,709

(22) PCT Filed: May 22, 2015

(86) PCT No.: PCT/KR2015/005215
§ 371 (c)(1),
(2) Date: Jul. 22, 2016

(87) PCT Pub. No.: WO2015/178742
PCT Pub. Date: Nov. 26, 2015

(65) Prior Publication Data
US 2017/0010494 A1    Jan. 12, 2017

(30) Foreign Application Priority Data

May 22, 2014    (KR) .......... 10-2014-0061528

(51) Int. Cl.
*G02F 1/1335* (2006.01)
*G02F 1/13363* (2006.01)
(Continued)

(52) U.S. Cl.
CPC ........ *G02F 1/133528* (2013.01); *B32B 27/08* (2013.01); *C09D 167/02* (2013.01);
(Continued)

(58) Field of Classification Search
CPC .............. G02B 5/3083; G02F 1/13363; G02F 1/133528; G02F 2001/133567; G02F 2202/28; Y10T 428/1059; Y10T 428/1077
See application file for complete search history.

(56) References Cited

U.S. PATENT DOCUMENTS

| 8,426,632 B2 | 4/2013 | Tanaka et al. |
| 2008/0055523 A1* | 3/2008 | Nishihara ......... G02F 1/133504 349/96 |

(Continued)

FOREIGN PATENT DOCUMENTS

| CN | 1839176 A | 9/2006 |
| CN | 101103286 A | 1/2008 |

(Continued)

*Primary Examiner* — Sophie Hon
(74) *Attorney, Agent, or Firm* — Dentons US LLP

(57) ABSTRACT

The present invention relates to a polarizing plate including a polyethylene terephthalate film and having an excellent optical property, and a method for manufacturing the same, and the polarizing plate of the present invention includes: a water-based adhesive layer, a primer layer, and a polyethylene terephthalate protection film sequentially provided on at least one surface of a polarizer, in which the water-based adhesive layer is formed by using a water-based adhesive including a polyvinyl alcohol-based resin and a glyoxalate crosslinking agent at a weight ratio of 100:5 to 100:50, and the primer layer is formed by using a primer composition including a polyester-based compound and an acryl-based compound.

14 Claims, 4 Drawing Sheets

(51) Int. Cl.
*C09D 167/02* (2006.01)
*C09J 129/04* (2006.01)
*G02B 5/30* (2006.01)
*B32B 27/08* (2006.01)

(52) U.S. Cl.
CPC .......... *C09J 129/04* (2013.01); *G02B 5/3083* (2013.01); *G02F 1/13363* (2013.01); *G02F 2001/133567* (2013.01); *G02F 2202/28* (2013.01); *G02F 2413/01* (2013.01); *G02F 2413/05* (2013.01); *Y10T 428/1059* (2015.01); *Y10T 428/1077* (2015.01)

(56) References Cited

U.S. PATENT DOCUMENTS

| | | | |
|---|---|---|---|
| 2008/0137187 A1* | 6/2008 | Nishida | G02B 5/3016 359/487.06 |
| 2014/0293197 A1* | 10/2014 | Shin | G02B 5/3083 349/96 |
| 2014/0295174 A1 | 10/2014 | Eveson et al. | |
| 2015/0027899 A1 | 1/2015 | Morimitsu | |

FOREIGN PATENT DOCUMENTS

| | | | | |
|---|---|---|---|---|
| CN | 101378891 A | | 3/2009 | |
| CN | 101793980 A | | 8/2010 | |
| CN | 101900839 A | | 12/2010 | |
| CN | 103080815 A | | 5/2013 | |
| JP | 07242758 A | * | 9/1995 | |
| JP | 2011-008169 A | | 1/2011 | |
| JP | 2012-32696 A | | 2/2012 | |
| JP | 2012-041533 A | | 3/2012 | |
| KR | 10-2011-0075998 A | | 7/2011 | |
| KR | 10-2012-0010078 A | | 2/2012 | |
| KR | 10-2013-0066817 A | | 6/2013 | |
| KR | 20130066817 A | * | 6/2013 | |
| KR | 10-2013-0080596 A | | 7/2013 | |
| KR | 101337005 B1 | * | 12/2013 | ........... G02B 5/3083 |
| KR | 10-2014-0061528 A | | 5/2014 | |
| KR | 10-1389346 B1 | | 5/2014 | |
| TW | 200920780 | | 5/2009 | |

* cited by examiner

EXAMPLE 4   COMPARATIVE   COMPARATIVE
            EXAMPLE 4     EXAMPLE 1

EXAMPLE 4

POLARIZING PLATE WITH POLYETHYLENE TEREPHTHALATE FILM AS PROTECTIVE FILM, AND METHOD FOR MANUFACTURING SAME

TECHNICAL FIELD

This application is a National Stage Entry of International Application No. PCT/KR2015/005215, filed on May 22, 2015, and claims the benefit of and priority to Korean Application No. 10-2014-0061528, filed on May 22, 2014, both of which are incorporated herein by reference in their entirety for all purposes as if fully set forth herein.

The present invention relates to a polarizing plate and a method for manufacturing the same, and more particularly, to a polarizing plate including a polyethylene terephthalate film on at least one surface thereof as a protection film, and a method for manufacturing the same.

BACKGROUND ART

A polarizing plate has been generally used as a structure where a protection film is laminated on one surface or both surfaces of a polarizer formed of a polyvinyl alcohol (hereinafter, referred to as 'PVA')-based resin dyed with a dichromatic dye or iodine by using an adhesive. In the related art, a triacetyl cellulose (TAC)-based film has been mainly used as the protection film for the polarizing plate, but there is a problem in that the TAC film is easily deformed under the high temperature and high humidity environment. Accordingly, recently, protection films of various materials which can replace the TAC film have been developed, and for example, a method where polyethylene terephthalate (PET), cycloolefin polymer (COP), and acryl-based films, and the like are used alone or are used while being mixed is proposed.

Among them, since the polyethylene terephthalate film has lower costs and excellent durability as compared to the other polymer films, in order to reduce manufacturing costs of the polarizing plate, attempts for using the polyethylene terephthalate film as the protection film for the polarizer have continued. However, in the case of the polarizing plate proposed until now, in which the polyethylene terephthalate film is equipped, there is a problem in that since an in-plane retardation value of the polyethylene terephthalate film is large, when the polyethylene terephthalate film is equipped in a display device, stripes or hazes by optical interference occur, and thus the visual sense is not good.

Further, in the case where the polyethylene terephthalate film is attached to one surface of the polarizer and a polymer film made of the other material, for example, the polymer film such as a triacetyl cellulose film, an acryl film, and a cycloolefin polymer film is attached to the other surface, there is a problem in that orthogonal optical properties of the polarizing plate, such as orthogonal luminance or the degree of polarization, are severely degraded. The aforementioned problem tends to be further intensified under a high-speed lamination process condition in which a lamination process is performed at a high speed in order to improve productivity.

Further, in the case of the polyethylene terephthalate film, there are problems in that since adhesion force with a polyvinyl alcohol-based adhesive used for adhesion of the polarizer and the protection film in the related art is low, after the polarizing plate is manufactured, stripping and lifting of the protection film and the like easily occur to reduce durability, and since moisture permeability is low, drying is not easy when a water-based adhesive is used.

Therefore, there is a demand for developing a polarizing plate where the polyethylene terephthalate film is used as the protection film, the polarizing plate manufacturing materials and processes in the related art, such as the water-based adhesive and the high-speed lamination process, may be used as they are, and an excellent optical property is secured.

DETAILED DESCRIPTION OF THE INVENTION

Technical Problem

The present invention has been made in an effort to provide a polarizing plate including a polyethylene terephthalate protection film and a water-based adhesive and having an excellent optical property even though a high-speed lamination process is performed, and a method for manufacturing the same.

Technical Solution

In one aspect, the present invention provides a polarizing plate including: a water-based adhesive layer, a primer layer, and a polyethylene terephthalate protection film sequentially provided on at least one surface of a polarizer, in which the water-based adhesive layer is formed by using a water-based adhesive including a polyvinyl alcohol-based resin and a glyoxalate crosslinking agent at a weight ratio of 100:5 to 100:50, and the primer layer is formed by using a primer composition including a polyester-based compound and an acryl-based compound.

In this case, it is preferable that the primer composition include the polyester-based compound and the acryl-based compound at a weight ratio of 1:9 to 9:1. Further, if necessary, the primer composition may further include a styrene-based compound, and in this case, it is preferable that the styrene-based compound and the acryl-based compound be included at a weight ratio of 1:9 to 9:1.

Meanwhile, it is more preferable that the polyethylene terephthalate protection film be a stretched polyethylene terephthalate film, and an in-plane retardation value of the stretched polyethylene terephthalate film may be about 4000 nm to 10000 nm.

Further, in the polarizing plate of the present invention, the stretched polyethylene terephthalate protection film may be provided on one surface of the polarizer, and a triacetyl cellulose film, a cycloolefin polymer film, a norbornene film, a polycarbonate film, an acryl film, or a polyethylene terephthalate film may be provided on the other surface of the polarizer, and in this case, it is more preferable that the film provided on the other surface of the polarizer be the triacetyl cellulose film. In the present specification, the other surface of the polarizer means a surface of the polarizer, on which the (stretched) polyethylene terephthalate film is not provided.

In another aspect, the present invention provides a method for manufacturing a polarizing plate, including: disposing a polarizer and a polyethylene terephthalate protection film in parallel; forming a water-based adhesive layer by using a water-based adhesive including a polyvinyl alcohol-based resin and a glyoxalate crosslinking agent at a weight ratio of 100:5 to 100:50 between the polarizer and the polyethylene terephthalate protection film; forming a primer layer by using a primer composition including a polyester-based compound and an acryl-based compound between the polyethylene terephthalate protection film and the water-based adhesive layer; and attaching the polyethylene terephthalate protection film onto at least one surface of the polarizer via the water-based adhesive layer and the primer layer.

In this case, the attaching of the polyethylene terephthalate protection film onto at least one surface of the polarizer may be performed by a method of laminating the polarizer and the polyethylene terephthalate protection film and then performing drying at a temperature of 20° C. to 100° C. to cure the water-based adhesive layer and the primer layer.

Further, the method for manufacturing the polarizing plate according to the present invention, if necessary, may further include: attaching a triacetyl cellulose film, a cycloolefin polymer film, a norbornene film, a polycarbonate film, or an acryl film onto the other surface of the polarizer, on which the polyethylene terephthalate protection film is not laminated.

In yet another aspect, the present invention provides an image display including: the polarizing plate of the present invention, and in this case, the image display may be a liquid crystal display, an organic light emitting display, or the like.

Further, the present invention provides a liquid crystal display including: a liquid crystal display panel including an upper substrate, a lower substrate, and a liquid crystal cell interposed between the upper substrate and the lower substrate; a backlight unit disposed on a lower portion of the lower substrate; and the polarizing plate disposed between the liquid crystal panel and the backlight unit.

Advantageous Effects

A polarizing plate of the present invention has a merit in that an inexpensive polyethylene terephthalate film is used as a protection film and a water-based adhesive used in a manufacturing process of a polarizing plate in the related art is used as it is, and thus production costs are low.

Further, in the polarizing plate of the present invention, even in the case where a high-speed lamination process is used or a polymer film made of a material, which is different from that of the polyethylene terephthalate film, is attached onto the other surface of the polarizer as the protection film, stains of an adhesive are not generated, and the polarizing plate has an excellent optical property, and particularly, an excellent orthogonal optical property.

BEST MODE

Figure 1:
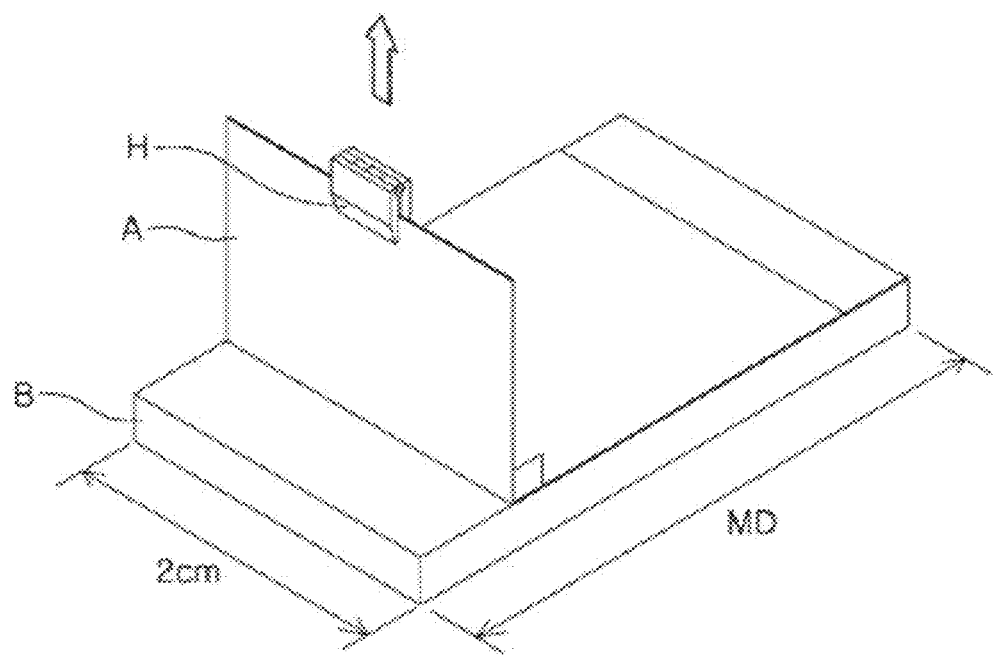
FIG. 1 is a view illustrating a measurement method of adhesion force of a polarizing plate of the present invention.

Hereinafter, the present invention will be more specifically described.

The present inventors have studied repeatedly to develop a polarizing plate having high adhesion force to a polyethylene terephthalate film even though a water-based adhesive is used and maintaining an excellent optical property even though the polarizing plate is manufactured by a high-speed lamination process, and as a result, found that the aforementioned objects can be achieved by adding a predetermined content of glyoxalate to the water-based adhesive and forming a primer layer by using a primer composition where a polyester-based compound and an acryl-based compound are mixed, thereby accomplishing the present invention.

To be more specific, the polarizing plate of the present invention includes a water-based adhesive layer, a primer layer, and a polyethylene terephthalate protection film sequentially provided on at least one surface of a polarizer, in which the water-based adhesive layer is formed by using a water-based adhesive including a polyvinyl alcohol-based resin and a glyoxalate crosslinking agent at a weight ratio of 100:5 to 100:50, and the primer layer is formed by using a primer composition including a polyester-based compound and an acryl-based compound. In this case, 100 weight ratio of the polyvinyl alcohol-based resin, which is a standard of the weight ratio, means 100 parts by weight of a solid of the polyvinyl alcohol-based resin, and the rest is the same as above.

Hereinafter, constitutional elements of the polarizing plate of the present invention will be more specifically described.

Polarizer

The polarizer capable of being used in the present invention is not particularly limited, but may be polarizers generally used in the corresponding technical field, for example, a film aligned in a predetermined direction by adsorbing a polarizing material, such as iodine or a dichromatic dye, on a hydrophilic polymer film, such as a polyvinyl alcohol-based film, a partially formalized polyvinyl alcohol-based film, and an ethylene•vinyl acetate copolymer-partially saponified film, and performing elongation, a polyene-based aligned film such as a dehydrated substance of polyvinyl alcohol or a dechlorinated substance of polyvinyl chloride, or the like, and preferably a polyvinyl alcohol-based polarizer where molecular chains containing an iodine-based compound or a dichromatic polarizing material are aligned in a predetermined direction.

Meanwhile, the polyvinyl alcohol-based polarizer may be manufactured by a manufacturing method of the polyvinyl alcohol-based polarizer well known in the corresponding technical field, and the manufacturing method is not particularly limited. For example, the polarizer capable of being used in the present invention may be manufactured by impregnating a non-stretched polyvinyl alcohol-based film in an iodine and/or dichromatic dye aqueous solution to perform exhaustion, followed by crosslinking and elongation, or may be manufactured by applying a polyvinyl alcohol-based resin on a polymer base film or laminating or adhering the polyvinyl alcohol-based film on or onto the polymer base film to form a film laminate, impregnating the film laminate in the iodine and/or dichromatic dye aqueous solution to perform exhaustion, followed by crosslinking, elongation, and separating from the polymer base film.

Alternatively, the polyvinyl alcohol-based polarizer may be used by purchasing products commercially available on the market.

Water-based Adhesive Layer

The water-based adhesive layer of the present invention is formed by using the water-based adhesive including the polyvinyl alcohol-based resin and the glyoxalate crosslinking agent.

The polyvinyl alcohol-based resin is used in order to adhere a polarizing element and a protection film in the related art, any polyvinyl alcohol-based resin known in the corresponding technical field may be used without a limit, and a kind of the polyvinyl alcohol-based resin is not particularly limited. For example, in the present invention, as the polyvinyl alcohol-based resin, a polyvinyl alcohol resin, a denatured polyvinyl alcohol resin including one kind or more functional groups selected from the group consisting of an acetoacetyl group, a carboxylic acid group, an acryl group, and a urethane group, and the like may be used. In the case where the denatured polyvinyl alcohol-based resin including one kind or more functional groups selected from the group consisting of the acetoacetyl group, the carboxylic acid group, the acryl group, and the urethane group is used, the polyvinyl alcohol-based resin may be a polyvinyl alcohol-based resin denatured in the content of at most 15 mol %, preferably 0.01 to 15 mol %, and more preferably 0.5 to 8 mol % by at least one kind or more selected from the group consisting of the acetoacetyl group, the carboxylic acid group, the acryl group, and the urethane group, but is not limited thereto.

According to the exemplary embodiment of the present invention, the polyvinyl alcohol-based resin included in the water-based adhesive may be a polyvinyl alcohol-based resin containing the acetoacetyl group. Meanwhile, among them, an acetoacetyl group denatured polyvinyl alcohol-based resin is particularly preferable. This is because there is an effect in that in the case where the acetoacetyl group denatured polyvinyl alcohol-based resin is used, in addition to a hydrogen bond by a hydroxy group, a covalent bond between the glyoxalate crosslinking agent and the acetoacetyl group is formed to improve adhesion force of the adhesive and water resistance and prevent stains of the adhesive and the like and thus improve a quality.

Meanwhile, it is preferable that the average degree of polymerization of the polyvinyl alcohol-based resin and/or the denatured polyvinyl alcohol-based resin included in the water-based adhesive according to the present invention be about 500 to 1800. The average degree of polymerization of 500 to 1800 represents excellent physical properties in terms of an adhesion property according to a viscosity, a solid, and a use amount.

Meanwhile, a number average molecular weight (Mn) and a weight average molecular weight (Mw) of the polyvinyl alcohol-based resin used as the water-based adhesive according to the present invention may be about 3,000 to 12,000, and about 20,000 to 100,000, respectively. This is because the polyvinyl alcohol-based resin having the number average molecular weight and/or the weight average molecular weight in the aforementioned range is suitable to be used as the adhesive in terms of the viscosity and has sufficient water resistance after crosslinking.

Next, the glyoxalate is configured to crosslink the primer layer and the adhesive layer, and according to research of the present inventors, in the case where the glyoxalate crosslinking agent is used while being mixed with the water-based adhesive, as compared to the case where the different kinds of crosslinking agents are used, a very excellent effect to the polyethylene terephthalate protection film is exhibited.

Meanwhile, in the water-based adhesive of the present invention, the polyvinyl alcohol-based resin and the glyoxalate crosslinking agent are included at a weight ratio of 100:5 to 100:50. This is because in the case where content ratios of the polyvinyl alcohol-based resin and the glyoxalate crosslinking agent in the water-based adhesive satisfy the aforementioned numerical range, excellent adhesion force and water resistance performances may be obtained. Further, in the case where the content ratios of the polyvinyl alcohol-based resin and the glyoxalate crosslinking agent in the water-based adhesive deviate from the aforementioned numerical range, there is a problem in that due to a lack of adhesion force of the water-based adhesion layer, it is difficult to manufacture the polarizing plate.

Meanwhile, the water-based adhesive may further include water as a solvent in order to improve the viscosity and workability, and in this case, a content of a solid in the water-based adhesive may be about 1 wt % to 10 wt % and preferably about 2 wt % to 7 wt %.

Meanwhile, it is preferable that a thickness of the water-based adhesive layer formed by using the water-based adhesive be about 20 nm to 2000 nm. This is because in the case where the thickness of the water-based adhesive layer is less than 20 nm, adhesion force may be reduced, and in the case where the thickness is more than 2000 nm, drying efficiency may be reduced to negatively affect adhesion force, water resistance, and an optical property of the polarizing plate.

Meanwhile, the water-based adhesive layer may be formed by applying the water-based adhesive on one surface of the polarizer, or may be formed by forming a primer layer, which will be described later, on the polyethylene terephthalate protection film and then applying the water-based adhesive on the primer layer.

Primer Layer

The primer layer of the present invention is configured to improve adhesion force and water resistance of the water-based adhesive layer and the polyethylene terephthalate protection film, and is formed by the primer composition including the acryl-based compound and the polyester compound.

In this case, the (meth)acryl-based compound preferably includes, for example, one kind or more selected from the group consisting of alkyl (meth)acrylate, cycloalkyl (meth)acrylate, epoxy (meth)acrylate, hydroxyalkyl acrylate, alkyl (meth)acrylic acid, a polymer or a copolymer thereof, and the like, but the examples are not limited thereto. Among them, it is preferable that the (meth)acryl-based compound include $C_{1\sim10}$ alkyl (meth)acrylate, and it is particularly preferable that the (meth)acryl-based compound include methyl methacrylate or ethyl methacrylate. Meanwhile, the (meth)acryl-based compound may be a monomer type, an oligomer, a homopolymer, or a copolymer type where two kinds or more monomers are copolymerized.

Next, the polyester-based compound means a compound including an ester group formed by a reaction of carboxylic acid and alcohol at a main chain thereof, and for example, may be polyester glycol formed by a reaction of polybasic acid and polyol.

In this case, examples of the polybasic acid component may include aromatic dicarboxylic acid such as orthophthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid; aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; alicyclic dicarboxylic acid such as hexahydrophthalic acid, tetrahydrophthalic acid, 1,3-cyclohexanedicarboxylic acid, and 1,4-cyclohexanedicarboxylic acid; a reactive derivative such as acid anhydride, alkyl ester, and acid halide thereof, and the like. The examples may be used alone or in combination of two kinds or more. Among the examples, the terephthalic acid, the isophthalic acid, the succinic acid, and the like are particularly preferable. Further, the case where the isophthalic acid substituted by sulfonate is used as basic acid is particularly preferable in terms of water dispersibility.

Meanwhile, the polyol is not particularly limited as long as polyol has two or more hydroxyl groups in a molecule thereof, and predetermined appropriate polyol may be adopted. For example, the polyol is preferably at least one kind or more selected from the group consisting of ethylene glycol, 1,2-propanonediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythriol, glucose, sucrose, and sorbitol. Further, the case where dimethylolalkanoic acid, dimethylolacetic acid, dimethylolpropionic acid, and dimethylolbutanoic acid containing a carboxyl group are used alone or in combination of two kinds or more as polyol is particularly preferable in terms of water dispersibility.

Meanwhile, it is preferable that the polyester glycol be formed by reacting the polybasic acid and polyol at the mole ratio of 2.5:1 to 1:2.5, preferably 2.3:1 to 1:2.3, and more preferably 2:1 to 1:2. This is because in the case where the reaction mole ratio of the polybasic acid and polyol deviates from the aforementioned range, an odor may be generated or coating defects may be caused by unreacted monomers.

Meanwhile, it is preferable that the primer composition of the present invention be manufactured by the composition including the polyester-based compound and the acryl-based compound at the weight ratio of 1:9 to 9:1, preferably 2:8 to 8:2, and more preferably 3:7 to 7:3. This is because in the case where the weight ratio of the polyester-based compound and the acryl-based compound satisfies the aforementioned numerical range, properties such as adhesion force between the adhesion layer and the protection film and water resistance may be embodied to be excellent.

Meanwhile, if necessary, the primer layer may further include a styrene-based compound. The styrene-based unit may improve adhesion force between the adhesion layer and the protection film, and moreover, improve water resistance of the polarizing plate.

Examples of the styrene-based compound may include one kind or more selected from the group consisting of styrene, α-methyl styrene, 3-methyl styrene, p-methyl styrene, p-ethyl styrene, p-propylene styrene, 4-(p-methylphenyl) styrene, 1-vinylnaphthalene, p-chlorostyrene, m-chlorostyrene, and p-nitrostyrene, but are not limited thereto. Meanwhile, the styrene-based compound may be a monomer type, an oligomer, a homopolymer, or a copolymer type where two kinds or more monomers are copolymerized.

Meanwhile, in the case where the styrene compound is included in the primer composition, it is preferable that the acryl-based compound and the styrene-based compound be included at the weight ratio of 1:9 to 9:1, preferably 2:8 to 8:2, and more preferably 3:7 to 7:3. In the case where the weight ratio of the acryl-based compound and the styrene-based compound satisfies the aforementioned numerical range, compatibility of the polyester compound and the acryl-based compound is improved, and water resistance and adhesion force of the polarizing plate are more excellent.

It is preferable that the thickness of the primer layer formed by using the aforementioned primer composition be about 20 nm to 4000 nm. In the case where the thickness of the primer layer is less than 20 nm, an adhesion force improvement effect is insignificant, and when the thickness thereof is more than 4000 nm, the primer layer is nonuniformly coated, and drying efficiency may be reduced.

The primer layer may be provided between the polyethylene terephthalate protection film and the water-based adhesive layer. Meanwhile, the primer layer may be formed by a method of forming the water-based adhesive layer on one surface of the polarizer and then applying the primer composition on the water-based adhesive layer, or may be formed by a method of applying the primer composition on one surface of the polyethylene terephthalate protection film.

Polyethylene Terephthalate Protection Film

The polarizing plate of the present invention is characterized in that the polyethylene terephthalate film is used as the protection film attached onto at least one surface of the polarizer. In this case, the polyethylene terephthalate protection film means a film manufactured by a resin where 80 mol % or more of a repeating unit is ethylene terephthalate, and is a concept including a film manufactured by a resin including a constitutional unit derived from the other copolymerization component in addition to an ethylene terephthalate unit.

In this case, examples of the other copolymerization component may include a dicarboxylic acid component such as isophthalic acid, p-β-oxyethoxybenzoic acid, 4,4'-dicarboxydiphenyl, 4,4'-dicarboxybenzophenone, bis(4-carboxyphenyl)ethane, adipic acid, sebacic acid, 5-sodiumsulfoisophthalic acid, and 1,4-dicarboxycyclohexane; a diol component such as propylene glycol, butanediol, neopentylglycol, diethylene glycol, cyclohexanediol, an ethylene oxide addition of bisphenol A, polyethylene glycol, polypropylene glycol, and polytetramethylene glycol, and the like. The dicarboxylic acid component or the diol component may be, if necessary, used in combination of two kinds or more. Further, oxycarboxylic acid such as p-oxybenzoic acid may be jointly used together with the carboxylic acid component or the diol component. As the other copolymerization component, a small amount of the dicarboxylic acid component and/or the diol component containing an amide bond, a urethane bond, an ether bond, a carbonate bond, or the like may be used.

Meanwhile, it is more preferable that the polyethylene terephthalate protection film be a stretched polyethylene terephthalate film. This is because in the case where the non-stretched polyethylene terephthalate film is used, when the non-stretched polyethylene terephthalate film is applied to an image display, due to a high retardation property of the polyethylene terephthalate film, a display quality may be reduced. Specifically, in the case where the non-stretched polyethylene terephthalate film is used, a rainbow phenomenon may occur.

More preferably, an in-plane retardation value of the stretched polyethylene terephthalate film may be about 4000 nm to 10000 nm. This is because in the case where the in-plane retardation value satisfies the aforementioned numerical range, generation of interference stripes caused by interference of light is suppressed and a more vivid and clearer image may be implemented.

Meanwhile, a low refraction coating layer may be formed on at least one surface of the polyethylene terephthalate protection film, but is not essential. Since the polyethylene terephthalate film has a relatively higher refractive index as compared to the triacetyl cellulose film and the like, in the case where the polyethylene terephthalate film is used as the protection film, light reflection on the surface of the protection film may be increased to reduce transmittance of the polarizing plate. Therefore, it is preferable that in order to prevent this, the low refraction coating layer be formed on the surface of the polyethylene terephthalate protection film. The low refraction coating layer may be formed on one surface or both surfaces of the polyethylene terephthalate protection film, and preferably, may be formed on a surface that is opposite to a surface on which the primer layer is formed. According to the exemplary embodiment of the present invention, the polarizing plate may further include a low refraction coating layer on a surface of the polyethylene terephthalate protection film, which is opposite to a counter surface of the primer layer. Specifically, the polarizing plate may further include a low refraction coating layer on a surface of the polyethylene terephthalate protection film, which is opposite to a surface facing the primer layer.

The low refraction coating layer may be formed by a resin composition where a low refractive index material having a low refractive index is mixed with the polymer resin, and in this case, as the polymer resin, for example, the acryl-based resin may be used, and as the low refractive index material, a fluorine-based compound such as 1,1,1-trifluoroethane, polyvinylidene fluoride (PVDF), polytetrafluoroethylene (PTFE, Teflon) hydrofluoro ether, hydrochlorofluorocarbon, hydrofluorocarbon, perfluorocarbon, perfluoropolyether, perfluorooctanoic acid (PFOA), perfluorooctane sulfonate (PFOS), and a perfluoroalkoxyfluoro polymer, a silica-based compound, or the like may be used.

Polarizing Plate

The polarizing plate of the present invention includes the water-based adhesive layer, the primer layer, and the polyethylene terephthalate protection film sequentially provided on at least one surface of the polarizer. In this case, the polyethylene terephthalate protection film may be provided on only one surface of the polarizer, or provided on both surfaces of the polarizer.

Meanwhile, in the case where the polyethylene terephthalate protection film is provided on only one surface of the polarizer, a polymer film made of a different material, such as a triacetyl cellulose film, a cycloolefin polymer film, a norbornene film, a polycarbonate film, or an acryl film, may be provided on the other surface of the polarizer. In the case where the triacetyl cellulose film is provided, the water-based adhesive layer and/or the primer layer of the present invention may be provided between the triacetyl cellulose film and the polarizer. From the viewpoint that the same adhesive and primer composition may be used and production may be performed by one process, it is preferable to provide the triacetyl cellulose film on the other surface of the polarizer. Further, in this case, due to a difference between shrinkage ratios of the polyethylene terephthalate film and the triacetyl cellulose film, after the polarizing plate is manufactured, when the surface onto which the triacetyl cellulose film is attached is downwardly positioned, a curl which is downwardly convex is generated (see FIG. 4). In the case where this polarizing plate is used as a polarizing plate (lower polarizing plate) of a backlight side of a liquid crystal display by disposing the TAC film to face a liquid crystal panel side, an improvement effect of corner light leakage of an LCD device may be obtained.

Meanwhile, in the case where the cycloolefin polymer film, the norbornene film, the polycarbonate film, the acryl film, or the like is provided, it is preferable that a non-water-based adhesive layer be formed between the polymer films and the polarizer. This is because since these films have low moisture permeability, in the case where the water-based adhesive is used, a problem of difficulty of curing may occur.

Further, in the case where the polyethylene terephthalate protection film is provided on only one surface of the polarizer, a cohesive layer or an adhesive layer may be formed without the polymer film on the other surface of the polarizer. In this case, in the cohesive layer or the adhesive layer, a cohesive agent and/or an adhesive generally used in a polarizing plate technical field may be used without a limit, and the cohesive layer or the adhesive layer is not particularly limited.

Meanwhile, the polarizing plate of the present invention has very excellent orthogonal luminance and degree of polarization as compared to the polarizing plate in the related art to which the polyethylene terephthalate film, which does not include the water-based adhesive layer or the primer layer, is applied. Specifically, the polarizing plate of the present invention has orthogonal luminance improved by about 20% or more and the degree of polarization improved by about 0.001 or more as compared to the polarizing plate to which the polyethylene terephthalate film, which does not include the water-based adhesive layer or the primer layer, is applied.

Further, according to research of the present inventors, in the case where the water-based adhesive layer and the primer layer of the present invention are applied, even though the polyethylene terephthalate protection film is not subjected to separate surface reformation and the like, adhesion force between the water-based adhesive layer and the polyethylene terephthalate protection film is significantly improved. Specifically, in the polarizing plate of the present invention, adhesion force is improved by 800% or more as compared to the polarizing plate to which the polyethylene terephthalate film, which does not include the water-based adhesive layer or the primer layer, is applied.

The aforementioned polarizing plate of the present invention has excellent optical properties and mechanical strength, and thus may be very usefully used in an image display such as a liquid crystal display and an organic light emitting display. Particularly, the polarizing plate of the present invention may be usefully used as a lower polarizing plate disposed at a backlight side of the liquid crystal display, but is not limited thereto. To be more specific, the present invention provides a liquid crystal display including: a liquid crystal display panel including an upper substrate, a lower substrate, and a liquid crystal cell interposed between the upper substrate and the lower substrate; a backlight unit disposed at a lower portion of the lower substrate; and the polarizing plate disposed between the liquid crystal panel and the backlight unit. In this case, it is preferable that in the polarizing plate of the present invention, the polyethylene terephthalate protection film be disposed to face the backlight unit side.

Further, as described above, in the case where the polarizing plate of the present invention is used as the lower polarizing plate of the liquid crystal display, the lower polarizing plate is particularly preferably a polarizing plate where the polyethylene terephthalate film is provided on one surface of the polarizer and the triacetyl cellulose film is provided on the other surface of the polarizer, but is not limited thereto.

Further, in the liquid crystal display, in the polarizing plate, the stretched polyethylene terephthalate film may be provided on one surface of the polarizer, the triacetylcellulose film may be provided on the other surface of the polarizer, and the triacetylcellulose film may be disposed at a liquid crystal display panel side. In this case, it is preferable that in the polarizing plate, the triacetyl cellulose film be disposed at the liquid crystal display panel side, and to this end, the cohesive layer may be provided on a surface of the triacetyl cellulose film, which is opposite to a lateral surface of the polarizer. Specifically, the cohesive layer may be provided on a surface of the triacetyl cellulose film, which is opposite to a surface facing the polarizer. This is because in this case, the polarizing plate has a curl which is convex in a direction of the liquid crystal panel, and thus a prevention effect of corner light leakage may be obtained.

Manufacturing Method

The polarizing plate of the present invention may be manufactured through step (1) disposing a polarizer and a polyethylene terephthalate protection film in parallel, step (2) forming a water-based adhesive layer between the polarizer and the polyethylene terephthalate protection film, step (3) forming a primer layer between the polyethylene terephthalate protection film and the water-based adhesive layer, and step (4) attaching the polyethylene terephthalate protection film onto at least one surface of the polarizer via the water-based adhesive layer and the primer layer. In this case, since components and detailed matters of the polarizer, the water-based adhesive, the primer composition, and the polyethylene terephthalate protection film are the same as those described in the above, a detailed description thereof will be omitted.

First, after the polarizer and the polyethylene terephthalate protection film are disposed in parallel, the water-based adhesive layer and the primer layer are formed between the polarizer and the polyethylene terephthalate protection film. In this case, a method of forming the water-based adhesive layer and/or the primer layer is not particularly limited, and may be performed by using a resin composition applying method well known in the corresponding technical field, for example, a kneading method, a Meyer bar coating method, a gravure coating method, a comma coating method, a doctor blade method, a die coating method, a dip coating method, a spray method, and the like.

Further, the water-based adhesive layer and the primer layer may be formed so that the order of the polarizer/water-based adhesive layer/primer layer/polyethylene terephthalate protection film is secured, and application targets of the water-based adhesive layer and the primer layer are not limited. That is, both the water-based adhesive layer and the primer layer may be formed on the polarizer or on the polyethylene terephthalate protection film, or the water-based adhesive layer may be formed on the polarizer and the primer layer may be formed on the polyethylene terephthalate protection film.

Further, step (2) and step (3) may be simultaneously performed, or may be performed at a difference of time. However, in the case where the steps are performed at a difference of time, the order thereof is not limited. That is, after step (2) is performed, step (3) may be performed, or after step (3) is performed, step (2) may be performed.

For example, in the case where the water-based adhesive layer is formed by applying the water-based adhesive on at least one surface of the polarizer and the primer layer is formed by applying the primer composition on the polyethylene terephthalate protection film, step (2) and step (3) may be simultaneously performed. Meanwhile, in the case where the water-based adhesive layer is formed on one surface of the polarizer and the primer layer is then formed on the water-based adhesive layer, step (2) may be performed and step (3) may be then performed. Alternatively, in the case where the primer layer is formed on one surface of the polyethylene terephthalate protection film and the water-based adhesive layer is then formed on the primer layer, step (3) may be performed and step (2) may be then performed.

Meanwhile, step (3) the forming of the primer layer may include: applying the primer composition including the polyester-based compound and the acryl-based compound between the polyethylene terephthalate protection film and the water-based adhesive layer; and drying the primer composition at a temperature of 80° C. or more. In this case, a drying temperature of the primer layer is 80° C. or more or 120° C. or more and preferably 120° C. or more and 180° C. or less. In this case, adhesion force is very excellent, and according to research of the present inventors, in the case where the primer layer is formed by using the primer composition of the present invention including the polyester-based compound and the acryl-based compound, the drying temperature of the primer layer affects adhesion force, and in the case where the drying temperature of the primer layer is 120° C. or more, very excellent adhesion force may be obtained.

If the water-based adhesive layer and the primer layer are formed through the aforementioned processes, the polarizer and the polyethylene terephthalate protection film are attached. In this case, the attachment may be performed by a method of laminating the polarizer and the polyethylene terephthalate protection film, followed by drying at a temperature of 20° C. to 100° C., preferably 30° C. to 100° C., and more preferably 40° C. to 100° C. to cure the water-based adhesive layer.

Meanwhile, the method for manufacturing the polarizing plate according to the present invention, if necessary, may further include attaching a triacetylcellulose film, a cycloolefin polymer film, a norbornene film, a polycarbonate film, or an acryl film onto the other surface of the polarizer, on which the polyethylene terephthalate protection film is not laminated. The present step may be formed of a step of forming a second adhesive layer between the other surface of the polarizer and the triacetylcellulose film, the cycloolefin polymer film, the norbornene film, the polycarbonate film, or the acryl film, and a step of laminating the polarizer and the triacetylcellulose film, the cycloolefin polymer film, the norbornene film, the polycarbonate film, or the acryl film and then curing the second adhesive layer.

In this case, in the case where the film attached onto the other surface of the polarizer is the triacetyl cellulose film, the second adhesive layer may be formed according to the same component and formation method as the aforementioned water-based adhesive layer of the present invention, and if necessary, the primer layer of the present invention may be further formed between the second adhesive layer and the triacetyl cellulose film. In this case, the component and the formation method of the primer layer and the like are the same as those described in the above.

Meanwhile, in the case where the film attached onto the other surface of the polarizer is the cycloolefin polymer film, the norbornene film, the polycarbonate film, or the acryl film, it is preferable that the second adhesive layer be formed by a non-water-based adhesive, and it is preferable that after curing of the water-based adhesive layer formed at the polyethylene terephthalate protection film side is completed, the films be attached.

Hereinafter, the present invention will be described in more detail through the specific Examples. However, the following Examples are set forth to illustrate the present invention, but the scope of the present invention is not limited thereto.

PREPARATION EXAMPLE 1

Adhesive A

The polyvinyl alcohol resin containing the acetoacetyl group (5 wt %) (the average degree of polymerization of 2000, the degree of saponification of 94%, Nippon Synthetic Chemical Industry Co., Ltd.) was dissolved in pure water to manufacture the 4 wt % aqueous solution. Sodium glyoxalate was added thereto at the ratio of 10 parts by weight based on 100 parts by weight of the solid of the polyvinyl alcohol resin, followed by agitation and mixing to manufacture Adhesive A.

PREPARATION EXAMPLE 2

Adhesive B

Adhesive B was manufactured by the same method as Preparation Example 1, except that 6.7 parts by weight of the titanium amine complex crosslinking agent (trade name: TYZOR TE, DuPont Company) was used instead of 10 parts by weight of sodium glyoxalate as the crosslinking agent.

PREPARATION EXAMPLE 3

Primer Composition A

Ethylene glycol, 1,4-butanediol, terephthalic acid, and isophthalic acid were added at the mole ratio of 0.5:0.5:0.5:0.5, and esterification was performed to manufacture the polyester resin.

After the acryl resin (manufacturer: LG MMA) and the styrene resin (manufacturer: Aldrich Corporation) were mixed at the weight ratio of 5:5, 30 parts by weight of the mixture was added to 70 parts by weight of the polyester resin to manufacture Primer Composition A.

PREPARATION EXAMPLE 4

Primer Composition B

Ethylene glycol, 1,4-butanediol, terephthalic acid, and isophthalic acid were added at the mole ratio of 0.5:0.5:0.5:0.5, and esterification was performed to manufacture the polyester resin.

30 parts by weight of the epoxy-based compound (manufacturer: ARAKAWA Co., Ltd., product name: Modepics 502) was added to 70 parts by weight of the polyester resin to manufacture Primer Composition B.

PREPARATION EXAMPLE 5

Primer Composition C

Ethylene glycol, 1,4-butanediol, terephthalic acid, and isophthalic acid were added at the mole ratio of 0.5:0.5:0.5:0.5, and esterification was performed to manufacture the polyester resin.

30 parts by weight of the urethane-based compound (manufacturer: DIC Corporation, product name: AP-201) was added to 70 parts by weight of the polyester resin to manufacture Primer Composition B.

PREPARATION EXAMPLE 6

Polarizer

The polyvinyl alcohol film (Kyraray Co., Ltd., the degree of polymerization of 2000) having the thickness of µm was swollen in the pure solution at 25° C. for 75 seconds, and then subjected to the exhaustion process in the iodine solution having the concentration of 0.12 wt % at 30° C. for 80 seconds. Subsequently, the washing process was performed in the boric acid solution having the concentration of 0.12 wt % at 40° C. for 20 seconds, and elongation was performed by six times in the boric acid solution having the concentration of 3.5 wt % at 52° C. After elongation, the complementary coloring process was performed in the 5 wt % KI solution, followed by drying in the oven at 80° C. for 5 minutes to manufacture the polarizer.

EXAMPLE 1

Primer Composition A manufactured by Preparation Example 3 was applied by bar coating on one surface of the polyethylene terephthalate protection film (PET, Teijin-DuPont Limited), and then dried at 120° C. for 3 minutes to form the primer layer having the thickness of 200 nm. Thereafter, the acryl resin mixed with 1,1,1-trifluoroethane was applied on the other surface of the PET film to form the low refraction coating layer.

After the triacetyl cellulose (TAC) film having the thickness of 60 µm was positioned on one surface of the polarizer manufactured by Preparation Example 6 and the PET film where the primer layer and the low refraction coating layer were formed was positioned on the other surface, Adhesive A manufactured by Preparation Example 1 was interposed between the polarizer and the TAC film and between the polarizer and the PET film, and laminated by the laminator, followed by drying in the oven at 80° C. for 5 minutes to manufacture the polarizing plate. The manufactured polarizing plate had the structure of the low refraction coating layer/PET film/primer layer/adhesive layer/polarizer/adhesive layer/TAC film.

EXAMPLE 2

The polarizing plate was manufactured by the same method as Example 1, except that the drying temperature of the primer layer was 140° C.

EXAMPLE 3

The polarizing plate was manufactured by the same method as Example 1, except that the drying temperature of the primer layer was 160° C.

EXAMPLE 4

The polarizing plate was manufactured by the same method as Example 1, except that the drying temperature of the primer layer was 180° C.

REFERENCE EXAMPLE 1

The polarizing plate was manufactured by the same method as Example 1, except that the drying temperature of the primer layer was 110° C.

COMPARATIVE EXAMPLE 1

The polarizing plate was manufactured by the same method as Example 1, except that the polyethylene terephtalate film where the primer layer and the low refraction coating layer were not formed was used. The manufactured polarizing plate had the structure of the PET film/adhesive layer/polarizer/adhesive layer/TAC film.

COMPARATIVE EXAMPLE 2

The polarizing plate was manufactured by the same method as Example 1, except that Primer Composition B manufactured by Preparation Example 4 was used instead of Primer Composition A.

COMPARATIVE EXAMPLE 3

The polarizing plate was manufactured by the same method as Example 1, except that Primer Composition C manufactured by Preparation Example 5 was used instead of Primer Composition A.

COMPARATIVE EXAMPLE 4

The triacetyl cellulose (TAC) film having the thickness of 60 μm was positioned on both surfaces of the polarizer manufactured by Preparation Example 6, and Adhesive A manufactured by Preparation Example 1 was interposed between the polarizer and the TAC film, followed by lamination by the laminator and drying in the oven at 80° C. for 5 minutes to manufacture the polarizing plate. The manufactured polarizing plate had the structure of the TAC film/adhesive layer/polarizer/adhesive layer/TAC film.

COMPARATIVE EXAMPLE 5

The polarizing plate was manufactured by the same method as Example 1, except that Adhesive B manufactured by Preparation Example 2 was used instead of Adhesive A.

EXPERIMENTAL EXAMPLE 1

Measurement of Adhesion Force

Adhesion forces of the polarizing plates manufactured by Examples 1 to 4, Reference Example 1, and Comparative Examples 1 to 4 were measured. Adhesion force of the polarizing plate, as illustrated in FIG. 1, was measured by the method of fixing the polyvinyl alcohol film A of the polarizing plate sample cut in the width of 2 cm to the sample holder H and applying force in the direction vertical to the plane direction of the polarizing plate to measure force (90° stripping force) required to strip the polyvinyl alcohol film A from the protection film B, and as measurement equipment, the Texture Analyzer (Model name: TA-XT Plus) manufactured by Stable Micro Systems Ltd was used.

Figure 2:
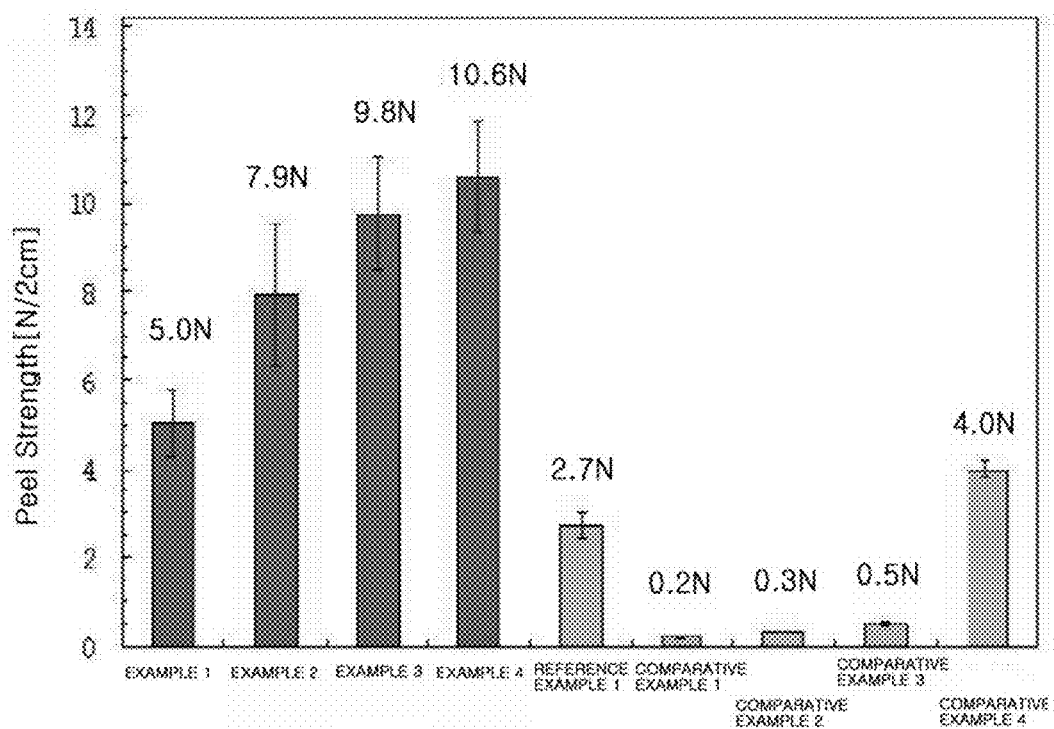
FIG. 2 is a view illustrating a measurement result of adhesion force of Experimental Example 1.

The measurement result is illustrated in FIG. 2. Through FIG. 2, it can be seen that the polarizing plates of Examples 1 to 4 have excellent adhesion force as compared to the polarizing plate of Comparative Example 4 which is the structure of the general polarizing plate in the related art. However, in the case of the polarizing plate of Reference Example 1 having the relatively low drying temperature, adhesion force is slightly reduced, but even in this case, adhesion force is excellent as compared to Comparative Examples 1 to 3 using the primer layer that is different from that of the present invention.

EXPERIMENTAL EXAMPLE 2

Measurement of Water Resistance

Figure 3:
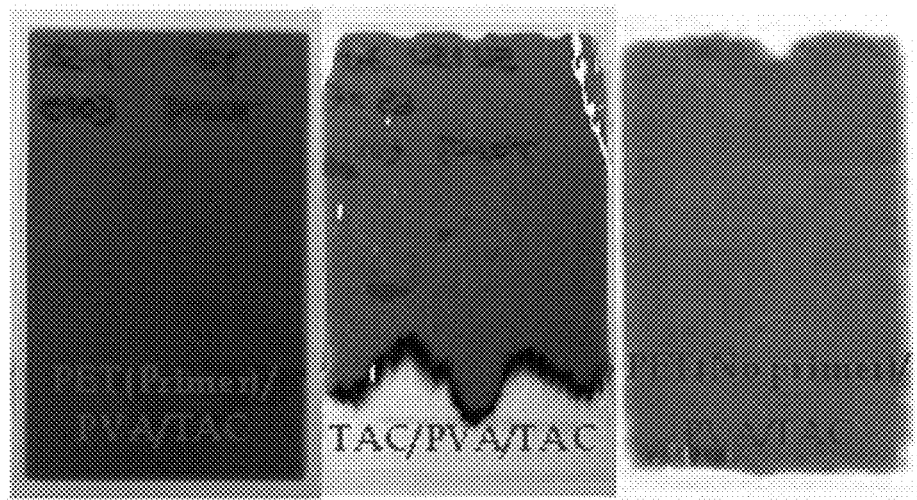
FIG. 3 is a picture illustrating a measurement result of water resistance of Experimental Example 2.

After the polarizing plates of Example 4, Comparative Example 1, and Comparative Example 4 were immersed in water at 60° for 24 hours, the surface state was confirmed. FIG. 3 illustrates a picture obtained by photographing the surface states of the polarizing plates after immersion.

As illustrated in FIG. 3, it can be seen that in the case of the polarizing plate of Example 4, even after immersion, the surface of the polarizing plate is cleanly maintained, but in the case of the polarizing plate of Comparative Example 1 where the primer layer is not formed and the polarizing plate of Comparative Example 4 where the TAC protection film is disposed on both surfaces, after immersion, the polarizer is damaged.

EXPERIMENTAL EXAMPLE 3

Measurement of Optical Property

Simple substance transmittance (Ts) and the degree of polarization (DOP) of the polarizing plates manufactured by Example 4, Comparative Example 1, and Comparative Examples 4 and 5 were measured by using the JASCO V-7100 spectrophotometer. Further, after the polarizing plates were each laminated on one surface of each of two 1.1 t glass substrates, two glass substrates were disposed on the backlight, the glass substrates were rotated to allow minimum orthogonal luminance to be exhibited, and then orthogonal luminance Lc was measured by CA-210 manufactured by Konica-Minolta, Inc. In this case, the two glass substrates were disposed so that surfaces onto which the polarizing plate was not attached came into contact with each other.

The measurement result is described in the following [Table 1].

TABLE 1

|  | Ts(%) | DOP | $L_c$ |
|---|---|---|---|
| Example 4 | 43.05 | 99.9951 | 0.16 |
| Comparative Example 1 | 40.87 | 99.9949 | 0.16 |
| Comparative Example 4 | 42.69 | 99.9946 | 0.17 |
| Comparative Example 5 | 42.83 | 99.9930 | 0.23 |

As illustrated in [Table 1], it can be seen that in the case of the polarizing plate of Example 4, simple substance transmittance and the degree of polarization are excellent as compared to the polarizing plates of the Comparative Examples. Further, it can be seen that in the case of the polarizing plate of Example 4, since the orthogonal luminance value is low, implementation of the black color is excellent, and specifically, when the polarizing plate of Example 4 is compared to that of Comparative Example 5, orthogonal luminance is improved by 30% or more.

EXPERIMENTAL EXAMPLE 4

Measurement of Curl Property

Figure 4:
FIG. 4 is a picture illustrating a curl property of a polarizing plate of Example 4.
Figure 4:

Curls of the polarizing plate manufactured by Example 4 were observed. As illustrated in FIG. 4, the polarizing plate of Example 4 has the curl that is downwardly convex when the PET film is disposed at the upper side. That is, in the case where in the polarizing plate, the PET film is disposed at the lower side, the curl that is upwardly convex is generated, and in the case where this polarizing plate is attached onto the lower substrate of the liquid crystal panel so that the PET film is positioned at the backlight side, a corner light leakage phenomenon by bending of the polarizing plate may be prevented.

EXPERIMENTAL EXAMPLE 5

Measurement of Light Leakage

Figure 5:
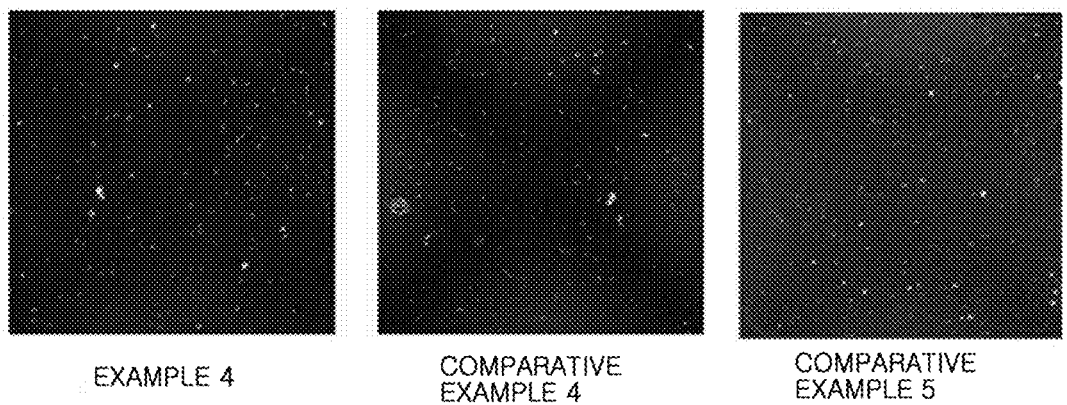
FIG. 5 is a picture illustrating a measurement result of light leakage of Experimental Example 5.

After two plates of each of the polarizing plates of Example 4 and Comparative Examples 4 and 5 were cut in the size of 15 cm×15 cm, the cohesive film was laminated at the upper part of the TAC film, and then the laminated films were attached onto both surfaces of the 1.1 t glass substrate so that absorption axes of the polarizing plates were vertical to each other. Thereafter, the glass substrate was added into the humidity and heat resistance chamber under the condition of 60° C. and 90% RH to be stored for 48 hours, and then pulled out to the outside of the chamber to be stored under the normal temperature and humidity environment of the 25° C. and 50% RH condition for 24 hours, and then the light leakage image exhibited after each sample was put on the backlight was photographed by the camera, and FIG. 5 illustrates the photographed picture. As illustrated in FIG. 5, it can be seen that in the case of Comparative Example 4, light leakage at the corner portion is very severely exhibited. It can be seen that in the case of Comparative Example 5, as compared to Comparative Example 4, less light leakages occur, but as compared to Example 4, relatively more corner light leakages occur. The aforementioned result is judged to show that the polarizing plate of the present invention is hardly deformed under the high temperature and humidity environment.

The invention claimed is:

1. A polarizing plate comprising:
a water-based adhesive layer, a primer layer, and a polyethylene terephthalate protection film sequentially provided on at least one surface of a polarizer,
wherein the water-based adhesive layer is applied to the at least one surface of the polarizer, and the primer layer is in contact with the polyethylene terephthalate protection film and the water-based adhesive layer,
wherein the polarizer is a polyvinyl alcohol-based film, a partially formalized polyvinyl alcohol-based film, or an ethylene vinyl acetate copolymer-partially saponified film, where molecular chains containing an iodine-based compound or a dichromatic polarizing material are aligned in a predetermined direction,
wherein the water-based adhesive layer is formed by using a water-based adhesive including a polyvinyl alcohol-based resin containing an acetoacetyl group, and a glyoxalate crosslinking agent at a weight ratio of 100:5 to 100:50, and the primer layer is formed by using a primer composition including a polyester-based compound, an acryl-based compound containing a (meth)acrylate group, and a styrene-based compound,
wherein the polyester-based compound is formed using a reaction of an aromatic polybasic acid component and a polyol at a main chain thereof,
wherein a weight ratio of the polyester-based compound and the acryl-based compound in the primer composition is 1:9 to 9:1, and
wherein a weight ratio of the acryl-based compound and the styrene-based compound in the primer composition is 3:7 to 7:3.

2. The polarizing plate of claim 1, wherein the polyethylene terephthalate protection film is a stretched polyethylene terephthalate film.

3. The polarizing plate of claim 2, wherein an in-plane retardation value of the stretched polyethylene terephthalate film is 4000 nm to 10000 nm.

4. The polarizing plate of claim 2, wherein the stretched polyethylene terephthalate film is provided on one surface of the polarizer, and a triacetyl cellulose film, a cycloolefin polymer film, a norbornene film, a polycarbonate film, an acryl film, or a polyethylene terephthalate film is provided on the other surface of the polarizer.

5. The polarizing plate of claim 4, wherein the triacetyl cellulose film is provided on the other surface of the polarizer.

6. The polarizing plate of claim 1, further comprising:
a low refraction coating layer on a surface of the polyethylene terephthalate protection film, which is opposite to a surface facing the primer layer.

7. An image display comprising:
the polarizing plate of claim 1.

8. A liquid crystal display comprising:
a liquid crystal display panel including an upper substrate, a lower substrate, and a liquid crystal cell interposed between the upper substrate and the lower substrate;
a backlight unit disposed at a lower portion of the lower substrate; and
the polarizing plate of claim 1 disposed between the liquid crystal display panel and the backlight unit.

9. The liquid crystal display of claim 8, wherein the polarizing plate includes a stretched polyethylene terephthalate film on one surface of the polarizer and a triacetyl cellulose film on the other surface of the polarizer, and the triacetyl cellulose film is disposed at a liquid crystal display panel side.

10. A method for manufacturing a polarizing plate, the method comprising:
disposing a polarizer and a polyethylene terephthalate protection film in parallel;
forming a water-based adhesive layer by using a water-based adhesive between the polarizer and the polyethylene terephthalate protection film;
forming a primer layer by using a primer composition between the polyethylene terephthalate protection film and the water-based adhesive layer; and
attaching the polyethylene terephthalate protection film onto at least one surface of the polarizer via the water-based adhesive layer and the primer layer;
wherein the water-based adhesive layer is applied to a surface of the polarizer, and the primer layer is in contact with the polyethylene terephthalate protection film and the water-based adhesive layer,
wherein the polarizer is a polyvinyl alcohol-based film, a partially formalized polyvinyl alcohol-based film, or an ethylene vinyl acetate copolymer-partially saponified film, where molecular chains containing an iodine-based compound or a dichromatic polarizing material are aligned in a predetermined direction,
wherein the water-based adhesive layer is formed by using a water-based adhesive including a polyvinyl alcohol-based resin containing an acetoacetyl group, and a glyoxalate crosslinking agent at a weight ratio of 100:5 to 100:50, and the primer layer is formed by using a primer composition including a polyester-based compound, an acryl-based compound containing a (meth)acrylate group, and a styrene-based compound,
wherein the polyester-based compound is formed using a reaction of an aromatic polybasic acid component and a polyol at a main chain thereof,
wherein a weight ratio of the polyester-based compound and the acryl-based compound in the primer composition is 1:9 to 9:1, and wherein a weight ratio of the acryl-based compound and the styrene-based compound in the primer composition is 3:7 to 7:3.

11. The method of claim 10, wherein the polyethylene terephthalate protection film is a stretched polyethylene terephthalate film.

12. The method of claim 11, wherein an in-plane retardation value of the stretched polyethylene terephthalate film is 4000 nm to 10000 nm.

13. The method of claim 10, wherein the forming of the primer layer includes: applying the primer composition including the polyester-based compound and the acryl-based compound between the polyethylene terephthalate protection film and the water-based adhesive layer; and drying the primer composition at a temperature of 80° C. or more.

14. The method of claim 10, wherein the attaching of the polyethylene terephthalate protection film onto at least one surface of the polarizer is performed by a method of laminating the polarizer and the polyethylene terephthalate protection film and then performing drying at a temperature of 20° C. to 100° C. to cure the water-based adhesive layer and the primer layer.

* * * * *